US008468504B2

(12) United States Patent
Hassan et al.

(10) Patent No.: US 8,468,504 B2
(45) Date of Patent: Jun. 18, 2013

(54) METHOD AND APPARATUS FOR INTERACTIVE SCHEDULING OF VLIW ASSEMBLY CODE

(75) Inventors: Ahmad Hassan, Islamabad (PK); Haroon-ur Rashid, Islamabad (PK); Mazhar Iqbal, Islamabad (PK); Mohammad Ayub Khan, Santa Clara, CA (US)

(73) Assignee: Streaming Networks (PVT.) Ltd., Santa Clara, CA (US)

( * ) Notice: Subject to any disclaimer, the term of this patent is extended or adjusted under 35 U.S.C. 154(b) by 1439 days.

(21) Appl. No.: 11/966,192

(22) Filed: Dec. 28, 2007

(65) Prior Publication Data

US 2009/0172584 A1    Jul. 2, 2009

(51) Int. Cl.
*G06F 9/45*    (2006.01)

(52) U.S. Cl.
USPC .......................... 717/140; 717/146; 717/151

(58) Field of Classification Search
None
See application file for complete search history.

(56) References Cited

U.S. PATENT DOCUMENTS

| | | | | |
|---|---|---|---|---|
| 6,038,396 | A * | 3/2000 | Iwata et al. | 717/146 |
| 6,553,502 | B1 * | 4/2003 | Hurd et al. | 713/320 |
| 6,748,589 | B1 * | 6/2004 | Johnson et al. | 717/151 |
| 7,080,365 | B2 * | 7/2006 | Broughton et al. | 717/146 |
| 7,269,827 | B2 * | 9/2007 | Metzger | 717/151 |
| 7,444,628 | B2 * | 10/2008 | Martin | 717/161 |
| 7,454,597 | B2 * | 11/2008 | Kailas et al. | 712/206 |
| 7,681,187 | B2 * | 3/2010 | Ludwig et al. | 717/151 |
| 7,765,342 | B2 * | 7/2010 | Whalley et al. | 710/49 |
| 7,814,486 | B2 * | 10/2010 | Papakipos et al. | 717/140 |
| 8,108,844 | B2 * | 1/2012 | Crutchfield et al. | 717/140 |
| 8,136,102 | B2 * | 3/2012 | Papakipos et al. | 717/140 |
| 8,136,104 | B2 * | 3/2012 | Papakipos et al. | 717/146 |
| 8,146,066 | B2 * | 3/2012 | Demetriou et al. | 717/146 |
| 8,250,549 | B2 * | 8/2012 | Reid et al. | 717/151 |
| 8,261,250 | B2 * | 9/2012 | Babaian et al. | 717/151 |
| 2004/0230770 | A1 * | 11/2004 | Odani et al. | 712/10 |
| 2008/0282237 | A1 * | 11/2008 | Dai et al. | 717/140 |
| 2012/0144376 | A1 * | 6/2012 | Van Eijndhoven et al. | 717/146 |

OTHER PUBLICATIONS

Y. N. Srikant and Priti Shankar; The Compiler Design Handbook Optimizations and Machine Code Generation, 2nd Edition, Chapter 19: Instruction Scheduling; 2007; [retrieved online on Jan. 5, 2013]; pp. 1-57; Retrieved from the Internet: <URL: http://www.crcnetbase.com/doi/pdfplus/10.1201/9781420043839.ch19>.*

(Continued)

*Primary Examiner* — Thuy Dao
*Assistant Examiner* — Hanh T Bui
(74) *Attorney, Agent, or Firm* — Firasat, Ali, Creso Legal

(57) ABSTRACT

A method and apparatus for the manually optimizing the scheduling of code are disclosed. Accordingly, a software development tool with a graphical user interface enables manually ordering the scheduling of operations for architectures that execute multiple instructions/operations per machine cycle, such as very long instruction word (VLIW) processors. Assistance is provided at the instruction scheduling stage of VLIW compilation process to increase instruction level parallelism (ILP). The apparatus provides graphical views of assembly code and related information. An interactive, user friendly method to manipulate the code during or after scheduling is provided. The programmer can temporarily pause the automated scheduling, override decision taken by the scheduler, and then resume scheduling. The method lets the programmer interact graphically with scheduling decisions in a feedback environment. The method allows movement of only those operations that do not violate the target processor architectural constraints and algorithmic constraints of the code being optimized.

20 Claims, 23 Drawing Sheets

OTHER PUBLICATIONS

Christoph Kebler and Andrzej Bednarski; A Dynamic Programming Approach to Optimal Itegrated Code Generation; 2001; [retrieved online on Jan. 5, 2013]; pp. 1-10; Retrieved from the Internet: <URL: http://delivery.acm.org/10.1145/390000/384219/p165-kebler.pdf?>.*

H. Dietz et al.; Statistic Synchronization Beyond VLIW; 1989; [retrieved online on Jan. 5, 2013]; pp. 1-10; Retrieved from the Internet: <URL: http://ieeexplore.ieee.org/stamp/stamp.jsp?tp=&arnumber=5349004>.*

* cited by examiner

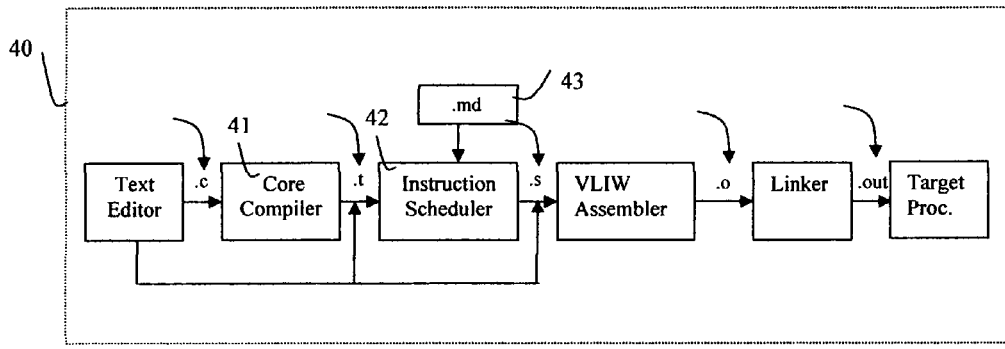

FIG. 4 (Prior Art)

```
MACHINE
    ARCHITECTURE   tm3260
    ISSUESLOTS     5
    REGISTERS      128    (* R0 == #0, R1 == #1 by convention.
Writing to R0/R1 is not allowed. *)
    WIDTH          32     (* registers are 32 bits *)
    WRITEBUSES     5
    BRANCHTARGET   42+42+42+42+42
    DCACHE_SIZE                      16384
    DCACHE_LINE_SIZE                 64
    DCACHE_ASSOCIATIVITY             8
    ICACHE_SIZE                      65536
    ICACHE_LINE_SIZE                 64
    ICACHE_ASSOCIATIVITY             8
    IS_INSTRUCTION_PADDING_NEEDED    1
    MAX_INSTRUCTION_SIZE             28

FUTYPE dspalu LATENCY 2 OPERATIONS
    uclip8iasr8add
    quadavg0 bilinear1 bilinear2 dspuquadabssub
    quadumaxbyte quaduminbyte
    quadiclipi quaduclipi
```

FIG. 5 (Prior Art)

```
_Dct8x8:
(* cycle 0 *)
uimm(4) -> r64,
uimm(1518492290) -> r65,
uimm(1518511486) -> r66,
ld32d(0) r5  -> r67,
ld32d(112) r5  -> r68;

(* cycle 1 *)
uimm(1984049404) -> r69,
uimm(821856702) -> r70,
uimm(2188798574) -> r71,
ld32d(48) r5  -> r72,
ld32d(64) r5  -> r73;

(*cycle 2 *)
uimm(419018979) -> r74,
uimm(3101917814) -> r75,
uimm(1785652999) -> r76,
ld32d(4) r5  -> r77,
ld32d(116) r5  -> r78;

(*cycle 3 *)
uimm(1785600249) -> r79,
uimm(1193116278) -> r80,
```

```
uimm(418989853) -> r81,
ld32d(52) r5  -> r82,
ld32d(68) r5  -> r83;

(*cycle 4 *)
uimm(2106223214) -> r84,
dualasl r67  r64  -> r85,
dualasl r68  r64  -> r86,
ld32d(8) r5  -> r87,
ld32d(120) r5  -> r88;

(*cycle 5 *)
dualasl r77  r64  -> r89,
funshift2 r85  r85  -> r90,
dualasl r78  r64  -> r91,
ld32d(56) r5  -> r92,
ld32d(72) r5  -> r93;

(*cycle 6 *)
funshift2 r86  r86  -> r94,
dualasl r72  r64  -> r95,
dualasl r82  r64  -> r96,
ld32d(12) r5  ->r97,
ld32d(124) r5  -> r98;
```

FIG. 6 (Prior Art)

| | Slot 1 | Slot 2 | Slot 3 | Slot 4 | Slot 5 |
|---|---|---|---|---|---|
| 0 | uimm (4) -> r64 | uimm (1518492290) -> r65 | uimm (1518511486) -> r65 | ld32d(0) r5 -> r67 | ld32d(112) r5 -> r68 |
| 1 | uimm (1984049404) -> r69 | uimm (821856702) -> r70 | uimm (2188798574)-> r71 | ld32d(48) r5 -> r72 | ld32d(64) r5 -> r73 |
| 2 | uimm (419018979) -> r74 | uimm (3101917814) -> r75 | uimm (1785652999)-> r76 | ld32d(4) r5 -> r77 | ld32d(116) r5 -> r78 |
| 3 | uimm (1785600249) -> r79 | uimm (1193116278) -> r80 | uimm (18989853) -> r81 | ld32d(52) r5 -> r82 | ld32d(68) r5 -> r83 |
| 4 | uimm (2106223214) -> r84 | dualasl r67 r64 ->r85 | dualasl r68 r64 -> r86 | ld32d(8) r5 -> r87 | ld32d(120) r5 -> r88 |
| 5 | dualasl r77 r64 -> r89 | funshift r85 r85 -> r90 | dualasl r78 r64 -> r91 | ld32d(56) r5 -> r92 | ld32d(72) r5 -> r93 |
| 6 | funshift2 r86 r86 -> r94 | dualasl r72 r64 -> r95 | dualasl r82 r64 -> r96 | ld32d(12) r5 -> r97 | ld32d(124) r5-> r98 |

FIG. 7

| Operations | |
|---|---|
| ... | |
| ● | 37 ld32d (104) 1 |
| ● | 38 ld32d (40) 1 |
| ● | 39 ld32d (88) 1 |
| ● | 40 ld32d (28) 1 |
| ☀ | 41 ld32d (108) 1 |
| ☀ | 42 ld32d (44) 1 |
| ☀ | 43 ld32d (92) 1 |
| ☀ | 44 uimm (4) |
| ☀ | 45 uimm (1518492290) |
| ☀ | 46 uimm (1518511486) |
| ☀ | 47 uimm (1984049404) |
| ☀ | 48 uimm (821856702) |
| ☀ | 49 uimm (2188798574) |
| ☀ | 50 uimm (419018979) |
| ☀ | 51 uimm (3101917814) |
| ☀ | 52 uimm (1785652999) |
| ☀ | 53 uimm (1785600249) |
| ☀ | 54 uimm (1193116278) |
| ☀ | 55 uimm (418989853) |
| ☀ | 56 uimm (2106223214) |
| ○ | 57 dualasl 3 44 |
| ○ | 58 dualasl 4 44 |
| ○ | 59 dualasl 5 44 |
| ○ | 60 dualasl 6 44 |
| | ... |

FIG. 8(b)

```
int dotproductW(int a, int b, int
n)
{
int i, sum, prod, v1, v2;

i = 0; sum = 0;
for(i=0; i<n; i++)
        {
        v1 = a[i];
        v2 = b[i];
        prod = v1 * v2;
        sum = sum + prod;
        }
return(sum);
}
```

FIG. 10(a) (Prior Art)

```
(* TriConv stands for TriMedia register usage convention, briefly given below:
            r0, r1: read only registers hard coded to 0 & 1, respectively;
            r2: return address;
            r3-r4: stack & frame pointers;
            r5: first argument of function and return value;
            r6-r8: second, third & fourth arguments of function;
            r9-r62: global registers;
            r63-r128: local registers;
    P-OP stands for Pseudo-operations
*)
        .text
        .global_dotproductW
  dotproductW:
__dotproductW_DT_0:
entree (0)
        8 rdreg (0);        (* P-OP: r0 contains 0 always, (TriConv)          *)
        11 wrreg (33) 8;    (* i is in stable register r33, (TriConv)         *)
        12 wrreg (34) 8;    (* sum is in stable register r34, (TriConv)       *)
        gotree (__dotproductW_DT_1)
endtree __dotproductW_DT_1:
tree (0)
        14 rdreg (5);       (* P-OP: a (first argument) is in r5, (TriConv)   *)
        15 rdreg (6);       (* P-OP: b (second argument)is in r6, (TriConv)   *)
        16 rdreg (7);       (* P-OP: n (third argument) is in r7, (TriConv)   *)
        17 rdreg (33);      (* P-OP: i is in r33, initialized in DT_0         *)
        18 rdreg (34);      (* P-OP: sum is in r34, initialized in DT_0       *)
        19 ild16x 14 17;    (* v1 = a[i]                                      *)
        20 ild16x 15 17 ;   (* v2 = b[i]                                      *)
        21 imul 19 20 ;     (* prod = v1 * v2                                 *)
        22 iadd 21 18 ;     (* sum = sum + prod                               *)
        23 iaddi (1) 17 ;   (* i = i + 1                                      *)
        24 igtr 16 23;      (* flag = n > i                                   *)
        25 wrreg (34) 22;   (* P-OP: assign sum to r34 for next iteration of loop*)
        26 wrreg (33) 23;   (* P-OP: assign i to r33 for next iteration of loop *)
        if 24 then
          gotree (__dotproductW_DT_1] (* generate immediate jump (ijmpi) instruction
                                         to repeat loop if flag TRUE*)
        else (24)
        27 wrreg (5) 22;    (* P-OP: assign sum to return value, i.e., r5 (TriConv)*)
            cgoto 13        (* goto return address, generate "ijmpt r1 r2" *)
        end (24)
endtree
```

FIG. 10(b) (Prior Art)

```
__dotproductW_DT_1:                if r66 ijmpi(__dotproductW_DT_1),
(* 0 *)                            nop,
iaddi(1) r33 -> r33,               nop;
nop,
nop,
ild16x r5 r33 -> r64,              (* 4 *)
ild16x r6 r33 -> r65;              nop,
                                   nop,
                                   nop,
(* 1 *)                            nop,
igtr r7 r33 -> r66,                nop;
nop,
nop,
nop,                               (* 5 *)
nop;                               nop,
                                   nop,
                                   nop,
(* 2 *)                            nop,
nop,                               nop;
nop,
nop,
nop,                               (* 6 *)
nop;                               iadd r34 r67 -> r34,
                                   nop,
                                   nop,
(* 3 *)                            nop,
nop,                               nop;
imul r64 r65 -> r67,
```

FIG. 11(a) (Prior Art)

| Operations | |
|---|---|
| ⊙ | 19 ild16x 14 17 |
| ⊙ | 20 ild16x 15 17 |
| ⊙ | 21 imul 19 20 |
| ⊙ | 22 iadd 21 18 |
| ⊙ | 23 iaddi (1) 17 |
| ⊙ | 24 igtr 16 23 |
| ⊙ | if 24 ijmpi(__dotproductW_DT_1) |

FIG. 11(c)

|   | Slot 1 | Slot 2 | Slot3 | Slot 4 | Slot 5 |
|---|--------|--------|-------|--------|--------|
| 0 | iaddi  |        |       | ild16x | ild16x |
| 1 | igtr   |        |       |        |        |
| 2 |        |        |       |        |        |
| 3 |        | imul   | ijmpi |        |        |
| 4 |        |        |       |        |        |
| 5 |        |        |       |        |        |
| 6 | iadd   |        |       |        |        |

|   | Slot 1 | Slot 2 | Slot 3 | Slot 4 | Slot 5 |
|---|---|---|---|---|---|
| 0 | 23 iaddi (1) 17 |  |  | 19 ild16x 14 17 | 20 ild16x 15 17 |
| 1 | 24 igtr 16 23 |  |  |  |  |
| 2 |  |  |  |  |  |
| 3 |  | 21 imul 19 20 | if 24 ijmpi(__dotproductW_DT_1) |  |  |
| 4 |  |  |  |  |  |
| 5 |  |  |  |  |  |
| 6 | 22 iadd 21 18 |  |  |  |  |

FIG. 11(e)

|   | Slot 1 | Slot 2 | Slot 3 | Slot 4 | Slot 5 |
|---|---|---|---|---|---|
| 0 | iaddi r33 -> r33 | | | ild16x r5 r33 -> r64 | ild16x r6 r33 -> r65 |
| 1 | igtr r7 r33 -> r66 | | | | |
| 2 | | | | | |
| 3 | | imul 64 r65 -> r67 | if r66 ijmpi(__dotproductW_DT_1) | | |
| 4 | | | | | |
| 5 | | | | | |
| 6 | iadd r34 r67 -> r34 | | | | |

FIG. 11(f)

| | Slot 1 | Slot 2 | Slot 3 | Slot 4 | Slot 5 | WB | Regs | Caller | Callee | Local |
|---|---|---|---|---|---|---|---|---|---|---|
| 0 | uimm | uimm | uimm | ld32d | ld32d | 0 | 119 | 31 | 24 | 64 |
| 1 | uimm | uimm | uimm | ld32d | ld32d | 3 | 116 | 31 | 24 | 61 |
| 2 | uimm | uimm | uimm | ld32d | ld32d | 3 | 113 | 31 | 24 | 58 |
| 3 | uimm | uimm | uimm | ld32d | ld32d | 5 | 108 | 31 | 24 | 53 |
| 4 | uimm | dualasl | dualasl | ld32d | ld32d | 5 | 103 | 31 | 24 | 48 |
| 5 | dualasl | funshift | dualasl | ld32d | ld32d | 5 | 98 | 31 | 24 | 43 |
| 6 | funshift2 | dualasl | dualasl | ld32d | ld32d | 5 | 93 | 31 | 24 | 38 |

FIG. 12

|  | Slot 1 | Slot 2 | Slot 3 | Slot 4 | Slot 5 |
|---|---|---|---|---|---|
| 60 | pack16msb | ifir16 | isub | iadd | h_st32d |
| 61 | pack16msb | ifir16 | ifir16 | iadd | h_st32d |
| 62 | iadd | ifir16 | ifir16 | pack16msb | h_st32d |
| 63 | isub | ifir16 | ifir16 | iadd | h_st32d |
| 64 | isub | ifir16 | ifir16 |  | h_st32d |
| 65 | pack16msb | ifir16 | ifir16 |  | h_st32d |
| 66 | pack16msb | ifir16 | ifir16 |  |  |
| 67 | isub | ifir16 | Ifir16 | iadd | h_st32d |
| 68 | isub | ifir16 | Ifir16 | iadd |  |
| 69 |  |  |  | pack16msb | dspisub |
| 70 |  | ifir16 | ifir16 | pack16msb | dspiadd |
| 71 | dspiadd | ifir16 | isub | iadd | h_st32d |
| 72 | isub | ifir16 | isub |  | h_st32d |
| 73 | iadd | ifir16 |  | iadd | h_st32d |
| 74 | isub | ifir16 | pack16msb | iadd | dspiadd |
| 75 | pack16msb | pack16msb | ifir16 |  | h_st32d |

FIG. 13(a)

|     | Slot 1     | Slot 2     | Slot 3    | Slot 4    | Slot 5   |
| --- | ---------- | ---------- | --------- | --------- | -------- |
| 60  | pack16msb  | ifir16     | isub      | iadd      | h_st32d  |
| 61  | pack16msb  | ifir16     | ifir16    | iadd      | h_st32d  |
| 62  | iadd       | ifir16     | ifir16    | pack16msb | h_st32d  |
| 63  | isub       | ifir16     | ifir16    | iadd      | h_st32d  |
| 64  | isub       | ifir16     | ifir16    |           | h_st32d  |
| 65  | pack16msb  | ifir16     | ifir16    |           | h_st32d  |
| 66  | pack16msb  | ifir16     | ifir16    |           |          |
| 67  | isub       | ifir16     | ifir16    | iadd      | h_st32d  |
| 68  | isub       | ifir16     | ifir16    | iadd      |          |
| 69  |            |            |           |           | dspisub  |
| 70  | pack16msb  | ifir16     | ifir16    | pack16msb | dspiadd  |
| 71  | dspiadd    | ifir16     | isub      | iad       | h_st32d  |
| 72  | isub       | ifir16     | isub      |           | h_st32d  |
| 73  | iadd       | ifir16     |           | iadd      | h_st32d  |
| 74  | isub       | ifir16     | pack16msb | iadd      | dspisub  |
| 75  | pack16msb  | pack16msb  | ifir16    |           | h_st32d  |

FIG. 13(b)

|     | Slot 1 | Slot 2 | Slot 3 | Slot 4 | Slot 5 |
| --- | --- | --- | --- | --- | --- |
| 60 | pack16msb | ifir16 | isub | iadd | h_st32d |
| 61 | pack16msb | ifir16 | ifir16 | iadd | h_st32d |
| 62 | iadd | ifir16 | ifir16 | pack16msb | h_st32d |
| 63 | isub | ifir16 | ifir16 | iadd | h_st32d |
| 64 | isub | ifir16 | ifir16 |  | h_st32d |
| 65 | pack16msb | ifir16 | ifir16 |  | h_st32d |
| 66 | pack16msb | ifir16 | ifir16 |  |  |
| 67 | isub | ifir16 | ifir16 | iadd | h_st32d |
| 68 | isub | ifir16 | ifir16 | iadd |  |
| 69 |  |  |  |  | dspisub |
| 70 | pack16msb | ifir16 | ifir16 | pack16msb | dspiadd |
| 71 | dspiadd | ifir16 | isub | iadd | h_st32d |
| 72 | isub | ifir16 | isub |  | h_st32d |
| 73 | iadd | ifir16 |  | iadd | h_st32d |
| 74 | isub | ifir16 | pack16msb | iadd | dspisub |
| 75 | pack16msb | pack16msb | ifir16 |  | h_st32d |

FIG. 13(c)

|    | Slot 1     | Slot 2     | Slot 3     | Slot 4     | Slot 5   |
|----|------------|------------|------------|------------|----------|
| 60 | pack16msb  | ifir16     | isub       | iadd       | h_st32d  |
| 61 | pack16msb  | ifir16     | ifir16     | iadd       | h_st32d  |
| 62 | iadd       | ifir16     | ifir16     | pack16msb  | h_st32d  |
| 63 | isub       | ifir16     | ifir16     | iadd       | h_st32d  |
| 64 | isub       | ifir16     | ifir16     |            | h_st32d  |
| 65 | pack16msb  | ifir16     | ifir16     |            | h_st32d  |
| 66 | pack16msb  | ifir16     | ifir16     |            |          |
| 67 | isub       | ifir16     | ifir16     | iadd       | h_st32d  |
| 68 | isub       | ifir16     | ifir16     | iadd       |          |
| 69 |            |            |            |            | dspisub  |
| 70 | pack16msb  | ifir16     | ifir16     | pack16msb  | dspiadd  |
| 71 | dspiadd    | ifir16     | isub       | iadd       | h_st32d  |
| 72 | isub       | ifir16     | isub       |            | h_st32d  |
| 73 | iadd       | ifir16     |            | iadd       | h_st32d  |
| 74 | isub       | ifir16     | pack16msb  | iadd       | dspisub  |
| 75 | pack16msb  | pack16msb  | ifir16     |            | h_st32d  |

FIG. 13(d)

|    | Slot 1 | Slot 2 | Slot 3 | Slot 4 | Slot 5 |
|----|--------|--------|--------|--------|--------|
| 60 | pack16msb | ifir16 | isub | iadd | h_st32d |
| 61 | pack16msb | ifir16 | ifir16 | iadd | h_st32d |
| 62 | iadd | ifir16 | ifir16 | pack16msb | h_st32d |
| 63 | isub | ifir16 | ifir16 | iadd | h_st32d |
| 64 | isub | ifir16 | ifir16 | | h_st32d |
| 65 | pack16msb | ifir16 | ifir16 | | h_st32d |
| 66 | pack16msb | ifir16 | ifir16 | | |
| 67 | isub | ifir16 | ifir16 | iadd | h_st32d |
| 68 | isub | ifir16 | ifir16 | iadd | |
| 69 | | | | | |
| 70 | pack16msb | ifir16 | ifir16 | pack16msb | dspiadd |
| 71 | dspiadd | ifir16 | isub | iadd | h_st32d |
| 72 | isub | ifir16 | dspisub | isub | h_st32d |
| 73 | iadd | ifir16 | | iadd | h_st32d |
| 74 | isub | ifir16 | pack16msb | iadd | dspisub |
| 75 | pack16msb | pack16msb | ifir16 | | h_st32d |

FIG. 13(e)

METHOD AND APPARATUS FOR INTERACTIVE SCHEDULING OF VLIW ASSEMBLY CODE

FIELD OF THE INVENTION

The invention pertains to the field of optimization of computer programs and in particular, a graphical tool for scheduling assembly code.

BACKGROUND

With the improvement in hardware and software technology in recent years, multimedia consumer electronic devices with support for video, audio and images have become prevalent. However, there is a never-ending demand for support of higher video resolutions, better video quality at lower bit-rates, lower power consumption, enhanced overall functionality, and so on. To meet the computationally demanding challenges necessary to support real-time multimedia-enabled devices, it becomes necessary to employ optimization strategies, including exploiting parallelism, targeting both hardware and software.

Although performance gains for processors have primarily been achieved by increasing processor clock-rates, significant improvement has also been achieved utilizing architectures that exploit instruction-level parallelism (ILP). Examples are pipelined processor, superscalar and very long instruction word (VLIW) architectures. These architectures leverage fine-grained parallelism in computer code to be able to execute more than one instruction per machine cycle.

With a superscalar architecture, independent instructions are detected in hardware and then executed in parallel. For instance, superscalar architectures exploit ILP by utilizing complex logic implemented in hardware to examine software code during runtime, and then reorder the software code for faster execution. Accordingly, with superscalar architectures, performance gains are achieved at the expense of more complex hardware.

Another approach to increasing ILP is that of very long instruction word (VLIW) technology. With a VLIW architecture, finding ILP and correctly scheduling parallel operations is a software function that occurs prior to run-time, i.e. at compile time, thereby resulting in a simpler and thus more economical hardware solution. However, with VLIW architectures, the challenge becomes one of designing a software compiler that is intelligent enough to decide on how to build the very long instruction word to utilize the target architecture optimally. Usually, a VLIW compiler first maps the program instructions from a higher level language construct to the basic ISA (instruction set architecture) of the processor. The instruction scheduler component of the compiler then does its best to identify independent basic operations. Next, the compiler maps the independent operations to appropriate functional units while maintaining the constraints imposed by the algorithm and architecture. Accordingly, the parallelized basic operations are packed into very long instruction words. During the execution phase, the processor unpacks the very long instruction words, and forwards the basic operations to multiple fractional units for simultaneous execution.

Generally, state of the art VLIW instruction schedulers are still not intelligent enough to generate optimally scheduled code. Therefore, hand-scheduling has to be resorted to for further exploitation of ILP and the underlying architecture. It is, however, well known that hand coding and scheduling at the assembly language level is an arduous and error prone task. Hence, a method and apparatus are needed that can make the job of low-level optimization easier and less error prone.

SUMMARY

A method and apparatus to assist an assembly programmer in code optimization are disclosed. Accordingly, code optimization support is provided for architectures that execute multiple instructions per machine cycle, such as VLIW processors. The apparatus provides visualization (e.g., by means of a graphical user interface) of VLIW scheduled assembly code and related information. An interactive, user-friendly method of manipulating the assembly code, for hand-scheduling, to increase ILP is provided. Low-level decisions made by the initial automated scheduler are graphically presented to the programmer for ratification. The programmer can then override these decisions by reordering the operations, in various ways, to further reduce the overall execution cycles. The method allows movement of only those operations that do not violate the underlying architectural and algorithmic constraints.

In one embodiment, the invention replaces the instruction scheduler component of the VLIW compiler. In a typical VLIW compilation cycle a higher level language code is first translated into an intermediate representation, which becomes input to the scheduler. The intermediate code forms a list of basic operations describing the algorithm. The input to the method and apparatus is this intermediate code.

Using standard techniques, a number of properties for each operation are derived from the intermediate representation. These properties are subsequently used to obtain a reordered linear list of operations for better scheduling.

The auto scheduler component of the apparatus starts scheduling, one basic operation at a time starting from the top of the linear list and the information is graphically presented to the programmer. The programmer can pause the scheduling at any instant of time to override current or previous automated decisions and resume scheduling. The manual manipulation that would violate architectural and/or algorithmic constraints is not allowed and the reason of violation is indicated to the programmer.

The apparatus provides view of linear list as well as the scheduled assembly code. The scheduled assembly code is shown in a two dimensional grid. The rows represent the machine cycle number and the columns correspond to issue slots of the architecture. Each cell consists of one basic scheduled operation. The apparatus also provides a graphical view of dependency graph indicating specified level of parent-children relationship between operations. The dependency graph as well as other related information is shown superimposed on the grid.

The programmer can now work his way manually by manipulating parents, children and siblings to arrive at an optimal solution. The method and apparatus thus provides an easier mechanism for hand scheduling VLIW assembly code. Feedback on any step which violates the architectural or algorithmic (data, dependency) constraints is provided, hence enabling the programmer to think at higher level without worry of making mistakes.

In another embodiment of the invention, the method takes both the scheduled assembly code as well as the intermediate code generated by the VLIW compiler as input. The back end engine establishes correspondence between the scheduled code and the linear list. The scheduled code is displayed and the manipulation can be carried out as before. In another embodiment, the invention can be directly integrated into the instruction scheduler part of the VLIW compiler.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 4 is a block diagram illustrating compilation system for TriMedia VLIW processors;

FIG. 5 illustrates a portion of a machine description file(.md) which provides the architectural information of the target VLIW processor;

FIG. 6 illustrates seven cycles of segment of an 8×8 DCT scheduled assembly code for TriMedia PNX1500 processor in textual form;

FIG. 7 illustrates in graphical form (grid view), the seven cycles of segment of an 8×8 DCT scheduled assembly code for TriMedia PNX1500 processor, corresponding to FIG. 6 code;

FIG. 8(b) illustrates the state of the operation alongside list view as scheduling progresses. The figure shows scheduled, ready and not ready states of the operations at one particular instance of scheduling. Ready operations are highlighted as lit circles. The operation that have been scheduled are shown as filled circles and ones that are not yet ready are shown by as empty circles;

FIG. 10(a)-(d) illustrate through an example, the initial stages for deriving information that is subsequently used to present it graphically to facilitate manual scheduling;

FIG. 10(a) illustrates a sample C code of a dot product function;

FIG. 10(b) illustrates intermediate representation in .t format of the C code;

FIG. 10(c) illustrates intermediate code format of a typical TriMedia operation;

FIG. 10(d) shows a dependency directed acyclic graph (DAG) of the first basic block of the second decision tree (_dotproductW_DT_1) of the .t code;

FIG. 11(a)-(e) illustrates various graphical views of the apparatus through an example;

FIGS. 11(a), 11(b) & 11(c) illustrates assembly code in textual form and in graphical forms of grid view and list view respectively, corresponding to DAG of FIG. 10(d);

FIG. 11(d) illustrates 'slack' the operation 'igtr', i.e. it can be scheduled in any of the 10 available slots of the two cycles; the view is that of 'concise view' in which only the op-code of the operation is shown in the cell;

FIG. 11(e) illustrates the 'normal view' showing the operands, operations numbers along with the op-code;

FIG. 11(f) shows the 'assembly view' in which register allocation for the operands and destination is shown.

FIG. 12 illustrates the status of VLIW register usage and writebacks, where TriMedia allows 5 writebacks as the maximum per cycle;

FIG. 13(a)-(e) illustrate usefulness of the invention in code optimization, whereby through interactive manipulation of the scheduled code a cycle with 5 nops are obtained which is subsequently deleted;

FIG. 13(a) illustrates a state of the scheduled code where cycle 69 has 3 no operations (nops) in slot 1 to slot 3;

FIG. 13(b) shows operation of cell [69,4] being moved to cell [70,1] such that cycle 69, now has 4 nops;

FIG. 13(c) illustrates that operation at cell [69,5] cannot be moved to cell [72,4] due to issue slot constraint;

FIG. 13(d) illustrates that operation at cell [72,3] can be moved to cell [72,4] to make room for operation at cell [69,5];

FIG. 13(e) shows cycle 69 consisting of all nops, which can now be deleted;

DESCRIPTION

The detailed description set forth below, in connection with the appended figures and drawings, is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form or otherwise in order to avoid obscuring the concepts of the present invention.

One or more embodiments of the present invention will now be described. Consistent with one embodiment of the invention, a software development tool for code optimization is provided. The software development tool provides visualization of a VLIW scheduled assembly code and its interactive manipulation to obtain a near optimal scheduled code. The invention allows manipulation of the code scheduling such that underlying architectural and algorithmic (data dependency) constraints are not violated. Accordingly, the software development tool is particularly advantageous when used in connection with architectures that execute multiple-instructions in parallel—particularly with VLIW processors which fall into the category of processors that execute multiple operations in parallel using more than one functional unit within the processor. However, any processor that executes more than one operation in a single cycle may also benefit from code optimization techniques of the software development tool.

For the purpose of describing the invention, a TriMedia processor, from NXP Semiconductors Inc. (NXP), which implements a VLIW core is used. Variants of the TriMedia CPU core are used in media processors from NXP, such as PNX1300, PNX1500 and PNX1700.

Figure 1:
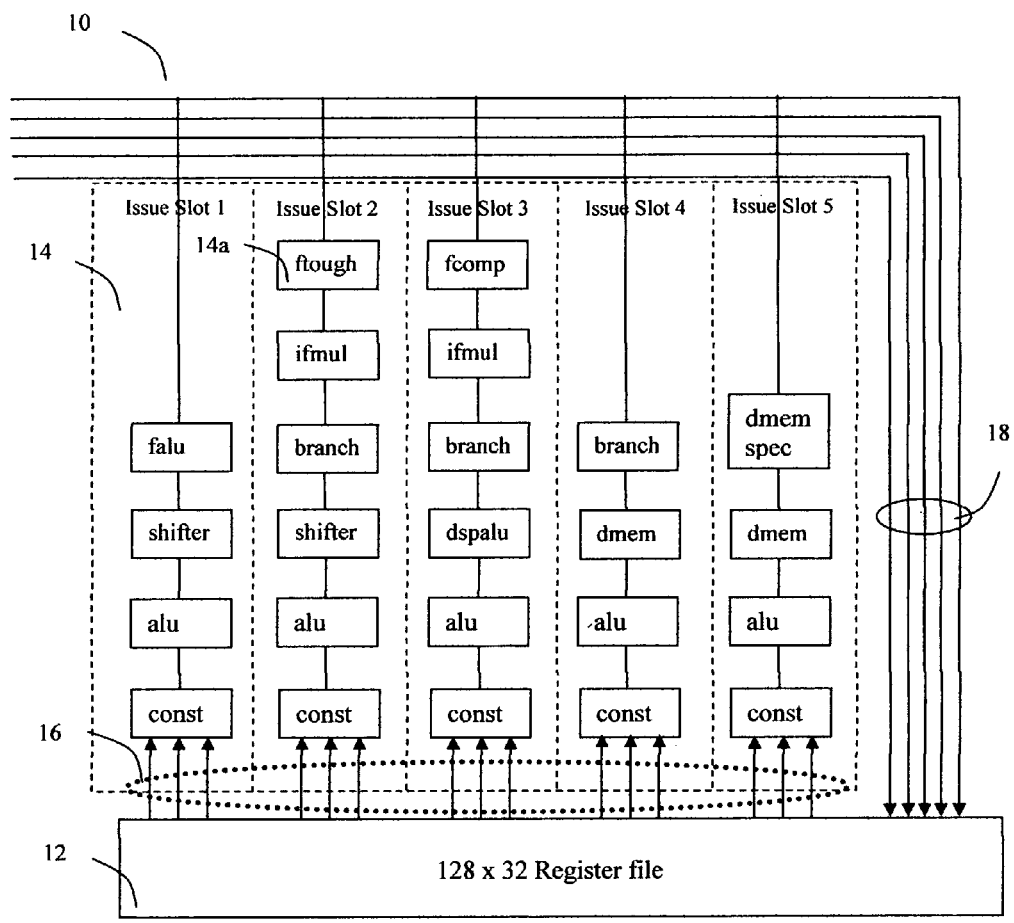
FIG. 1 illustrates an example of a simplified internal structure of PNX1300 TriMedia VLIW core.

FIG. 1 is a simplified block diagram of a TriMedia™32 core, which uses a VLIW instruction set architecture 10. The register file 12, consists of 128 general purpose 32-bit registers. The TriMedia VLIW instruction length allows a maximum of five simultaneous independent basic operations to be issued for every clock cycle. These operations can target any five of the twenty-eight functional units 14 of the CPU core 10, in parallel at any one time. Furthermore, all functional units, except ftough 14a, are themselves pipelined, allowing issue of a new basic operation every cycle even if latency of the operation takes more than one cycle. In this case, the latency of a functional unit is the time it needs to produce the result of an operation.

As illustrated in FIG. 1, the functional units have slot restrictions. For example, the functional unit ftough 14a can only be issued in slot 2. There are a total number of fifteen read ports 16 and five write ports 18. Each issue slot can use two of the read ports for source operands and another for a 'guard' register for conditional execution. The write port is for writing the result from the functional unit to the register file 12. A maximum of five writebacks 18 to register file are allowed per cycle.

Figure 2:
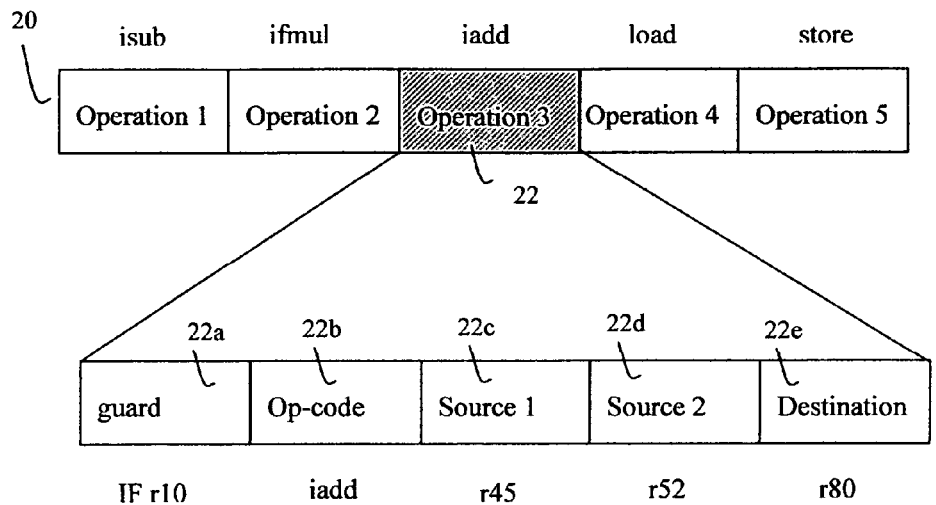
FIG. 2 illustrates a TriMedia VLIW instruction format.
Figure 3:
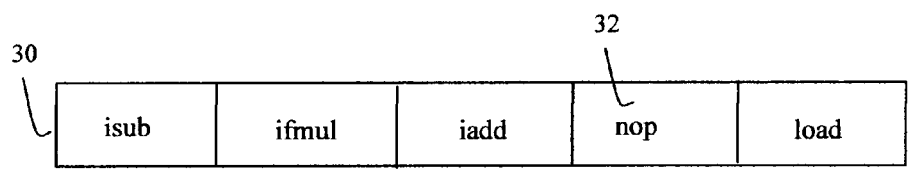
FIG. 3 illustrates a TriMedia VLIW instruction with a no operation "nop"

FIG. 2 shows an example of the format of a TriMedia VLIW instruction 20 consisting of five basic operations. The syntax of a typical operation 22 has five parts; the guard condition (IF r10) 22a; the op-code (iadd) 22b; the two source operands (r45 & r52) 22c and 22d; and the destination operand (r80) 22e. If constraints and dependencies do not allow any useful operation to be scheduled in a particular slot, a "no operation" (nop) needs to be inserted. For example, FIG. 3 shows a VLIW instruction 30 containing a nop 32, in the fourth issue slot. Accordingly, it is the instruction scheduler's responsibility to minimize the number of nops and thus try to maximize the operation density.

FIG. 4 shows a block diagram of a TriMedia VLIW compilation system (TCS) 40. The input to the core compiler 41 is typically a source code in the C programming language. The core compiler 41 converts the input code into an intermediate representation called tree code—with a ".t" file extension. The tree code is a list of basic operations describing their inter-dependencies. In the tree code format, functions are divided into basic blocks and decision trees. A basic block is a single-entry, single-exit grouping of operations; whereas a decision tree is a single-entry multiple-exit grouping of operations.

The instruction scheduler 42 schedules one decision tree at a time. A machine description file 43—with file extension ".md"—provides the instruction scheduler with the information about the architecture of the machine, such as the instruction set, number of registers, slot restrictions of functional units and the operation latencies, and so on. FIG. 5 illustrates a portion of a machine description file.

The output of the scheduler 42 is a TriMedia assembly file with file extension ".s", which is further processed by other stages of the compilation tools to arrive at an executable file with file extension ".out" for the target processor. In addition to the C programming language, programmers can write code in tree code (".t") and assembly (".s") file formats. However, programming in these formats has a significant level of difficulty. The tree code format (".t") is not very human readable, and the assembly file format (".s") suffers from the complexity of VLIW assembly language.

The problem of optimally scheduling instructions is known to be NP-complete (the most difficult problems in non-deterministic polynomial time). Hence, VLIW compilers generally use heuristics to generate optimized code. In certain cases, however, this can result in inefficiently scheduled code. This necessitates hand scheduling to be able to achieve acceptable performance. Currently, the programmer has to handcraft the assembly code keeping in mind the data dependencies as well as architectural constraints. For example, FIG. 6 shows a six cycle segment of an 8×8 DCT assembly code for TriMedia PNX1500 processor in textual form. It is evident that keeping track of the constraints such as latencies, issue slot restrictions, writeback restrictions and register assignment constraints, during its manipulation by hand is very difficult and demanding for a programmer. Advantageously, the software development tool described herein makes manual code optimization easier.

Consistent with embodiments of the invention, methods enabled by a software development tool facilitate the optimizing of assembly code by programmers in a manner that is easier than conventional hand-scheduling, e.g., by presenting scheduled operations graphically in an interactive feedback framework. The software development tool makes it possible to manipulate VLIW assembly code during scheduling, or after scheduling, along with support for overriding the automated scheduler decisions. Accordingly, a programmer does not have to worry about violating various constraints. The invention thus facilitates hand-scheduling via a graphical user interface with constraint checking, making it a less arduous and virtually error free task. The various components of the software development tool are collectively referred to herein as a Visual Interactive Scheduler (VIS).

Figure 8A:
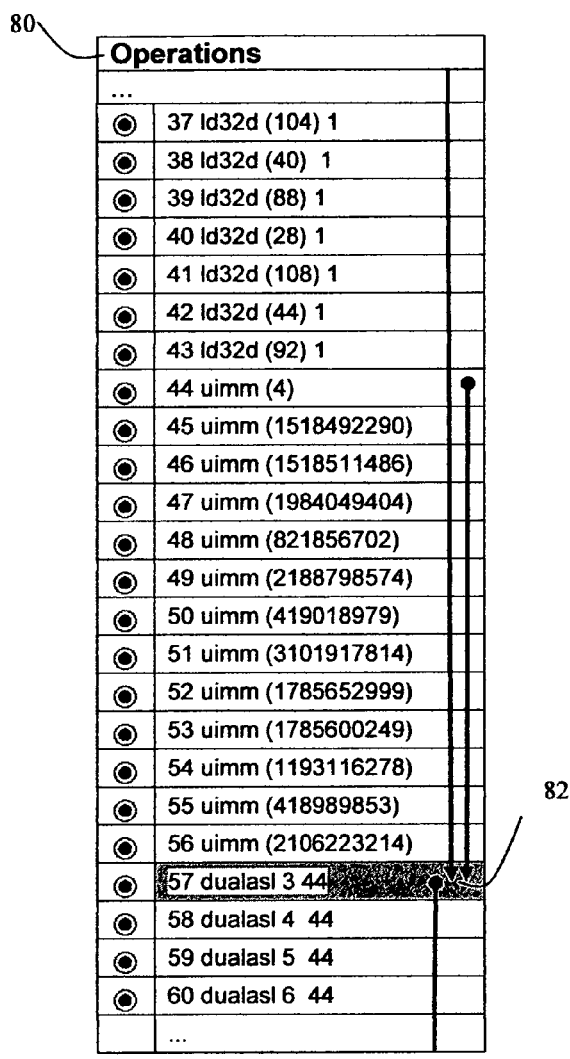
FIG. 8(a) illustrates in graphical form (list view), a segment of an 8×8 DCT list of operations for TriMedia PNX1500 processor corresponding to scheduled code of FIG. 7.

Consistent with one embodiment of the invention, multiple windows are used to present information graphically to a programmer during the course of code optimization. FIG. 7 illustrates one of the VIS windows—a grid view—showing scheduled operations in a two-dimensional grid, corresponding to the code shown in FIG. 6. A list view window, illustrated in FIGS. 8a and 8b, contains the corresponding linear list of operations 80.

According to one embodiment, the list view and the grid view are synchronized such that selection of an object in any one of these is reflected in the other. For example, this is evident by the highlighted operation 73 in FIG. 7 and operation 82 in FIG. 8(a) and the corresponding directed lines. The directed lines indicate the dependency relationships among operations. Moreover, VIS provides additional information graphically such as issue slot restrictions, latencies of operations, register usage, writeback count, and so on. The visual representation and interactivity provided by an embodiment of the invention, assists the programmer in manipulating the scheduled operations to achieve a better level of optimization.

Figure 9:
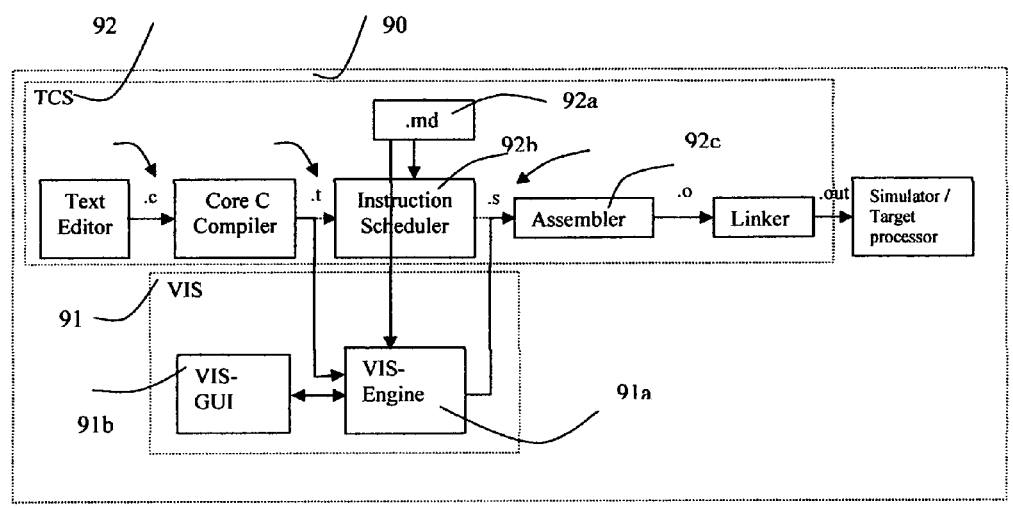
FIG. 9 is a block diagram illustrating the visual instruction scheduler (VIS) system along with a TriMedia VLIW compilation system.

In one embodiment, a VIS module can be plugged into any VLIW compilation tool chain in parallel with its instruction scheduler. FIG. 9 illustrates this embodiment of the invention 90, showing a VIS module 91 coupled to a TriMedia compilation system (TCS) 92. The VIS-Engine 91a is an instruction scheduler interfaced with VIS-GUI 91b to facilitate hand scheduling by presenting information graphically and interactively. The machine description file (with extension ".md") 92a provides machine awareness to the VIS-Engine 91a—the same file that is used by the TCS instruction scheduler 92b.

The process starts with a program in a high level language such as C that is to be optimized using VIS. The input to VIS is the intermediate representation (e.g., a tree code file with ".t" extension) of the program. The output of the VIS 91 is the hand optimized VLIW scheduled code (e.g., a file with extension ".s") which goes back to the TCS assembler module 92c for onward processing.

The VIS-Engine 91a, processes the intermediate code (".t") using well known data flow analysis techniques. One decision tree at a time is analyzed for data dependencies. The dependency directed acyclic graph (DAG) data structure for each decision tree of the function is built, where the nodes of a DAG represent the operations, and the directed edges represent the data dependencies. Next, weights are assigned to the edges of the DAG indicating the latencies of the corresponding operations. In this context, latency is the time taken in terms of number of cycles by a functional unit to generate its result. Latency provides the minimum distance, in terms of number of cycles, for the scheduling of a child after the parent has been scheduled.

A number of properties for each operation are determined, by tracing the paths of the dependency DAG, using well-known techniques. These properties can subsequently be used in various ways, for example, to reorder the list of operations prior to scheduling the code. The topological order has to be maintained during such reordering of operations.

Once reordered, the VIS auto scheduler starts from the top of the linear list and schedules ready operations at the earliest possible time. The ready operations are those operations whose parents have all been scheduled. After scheduling an operation, the children of the most recently scheduled operation are examined. Any child operation whose parents have all been scheduled is added to the ready list. The next operation for scheduling is then selected from the ready list and iterates until completion.

The VIS also displays the state of the operation alongside a list view of the operation as scheduling progresses. FIG. 8(b) shows scheduled, ready and not ready states of the operations at one particular instance of scheduling of a 8×8 DCT code. Ready operations 84 are highlighted as lit circles. The operations that, have been scheduled are shown as filled circles 86 and those that are not yet ready are shown as empty circles 88.

Consistent with one embodiment of the invention, there may be a number of ways for a programmer to interactively hand-schedule the list of operations. For instance, the programmer may stop the auto-scheduling at any time, and override a decision taken by the scheduler, and then resume with auto-scheduling. The programmer may also wait for the auto-scheduling to complete, and after all operations have been schedule, the programmer may search for optimizations to be made. Another way the programmer may intervene is by manually selecting and scheduling ready operations one at a time. In any case, manual manipulation that would violate architectural and/or algorithmic constraints is not entertained. If such a manipulation is attempted, the VIS indicates the reason the manipulation is not allowed.

When scheduling is paused for manual intervention, the VIS assists the programmer by representing information graphically. For example, FIG. 7 shows a grid view of a segment of an 8×8 DCT scheduled assembly code 70 for a TriMedia PNX1500 VLIW processor. The VLIW issue slots are shown horizontally 71 (SLOT 1 to SLOT 5) and the machine cycle numbers vertically, 72. A cell can thus be identified by an ordered pair [x,y], where x represents the machine cycle number and y represents the issue slot number.

In one embodiment, a feature of the VIS is to graphically show partial views of a dependency graph indicating specified levels of parent-children relationships. The programmer can select any operation and then view the immediate relations, and if needed, can view the distant relations as well. On selecting a particular operation, the operation is highlighted 73 and any dependency relationships are shown by directed lines. For example, the parents of selected cell [4, 2] 73 are cell [0, 1] 74 and cell [0, 4] 75 and the child is cell [5, 2] 76.

The latencies associated with a selected operation and that of the parents are shown as dotted directed lines. For example, the latency of the selected operation dualasl (arithmetic shift left) 73 is one 73a, whereas the latencies of its parents, uimm (load immediate) 74 and ld32d (load from memory) 75, are one 74a and three 75a respectively. The valid slots in which the selected operation can be issued are also highlighted. For example, the selected operation (dualasl) 73 can be issued in any of the 5 slots. Hence, all cells of the top row of FIG. 7 are highlighted.

An operation can be dragged and dropped from one cell to a "nop" in the grid view 70, provided architectural and algorithmic constraints are not violated. Similarly, two operations can also be swapped. Any violation is communicated to the programmer via a message window, or some other graphical means.

Referring again to FIG. 7, the grid view 70 also indicates the earliest and latest cycle for scheduling an operation while maintaining consistency with the algorithm defined by the DAG. This indicates the slack within which the programmer can manipulate (drag and drop) an operation, assuming its parents and children cannot be moved from their current positions. For example, the rectangular boundary 77 encompassing cycle three and four indicates slack for the operation 'dualasl' 73. Since the parents and the children are also indicated by the partial dependency graph, the programmer can easily see the reason of the imposed upper and lower limits.

Using information depicted graphically and the interactive approach of VIS, the programmer can readily manipulate the parents, children and siblings to achieve a desired optimization level.

For further describing the various stages of the VIS, a simple dot product function is used as an example. FIG. 10(a) shows the dot product function in the C programming language. A corresponding TriMedia intermediate code file (with extension ".t") 100, consisting of two decision trees, is shown in FIG. 10(b). The first decision tree, _dotproductW_DT_0 101, is the initialization part. The second decision tree, _dotproductW_DT_1, consists of two basic blocks. The first basic block 102, represents the loop, and the second basic block 103, is the exit/return logic of the function. Comments are provided alongside the (".t") code of FIG. 10(b) for explanation and to show correspondence with the C code.

Figure 10C:
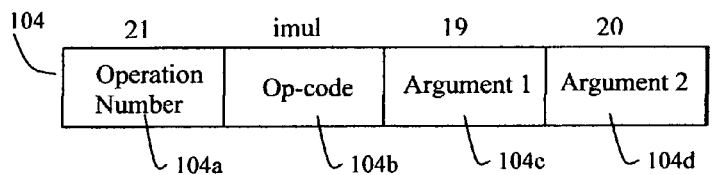

FIG. 10(c) illustrates the intermediate code format 104 of a typical TriMedia operation consisting of four parts: the operation number 21 104a, the op-code 'imul' 104b, the two arguments 19 104c and 20 104d. The arguments are operations numbers (19 and 20) corresponding to the previously defined operations, which the current operation uses as its input.

The op-codes can be TriMedia machine operations or pseudo operations. The operation 'imul' is an example of machine operation, whereas 'rdreg' and 'wrreg' are examples of pseudo operations. The pseudo operations establish a correspondence between operation numbers and hardware registers. The m rdreg(n) maps the hardware register n to the input of an operation with argument m. The wrreg m (n) maps the output of operation m to the hardware register n.

Figure 10D:
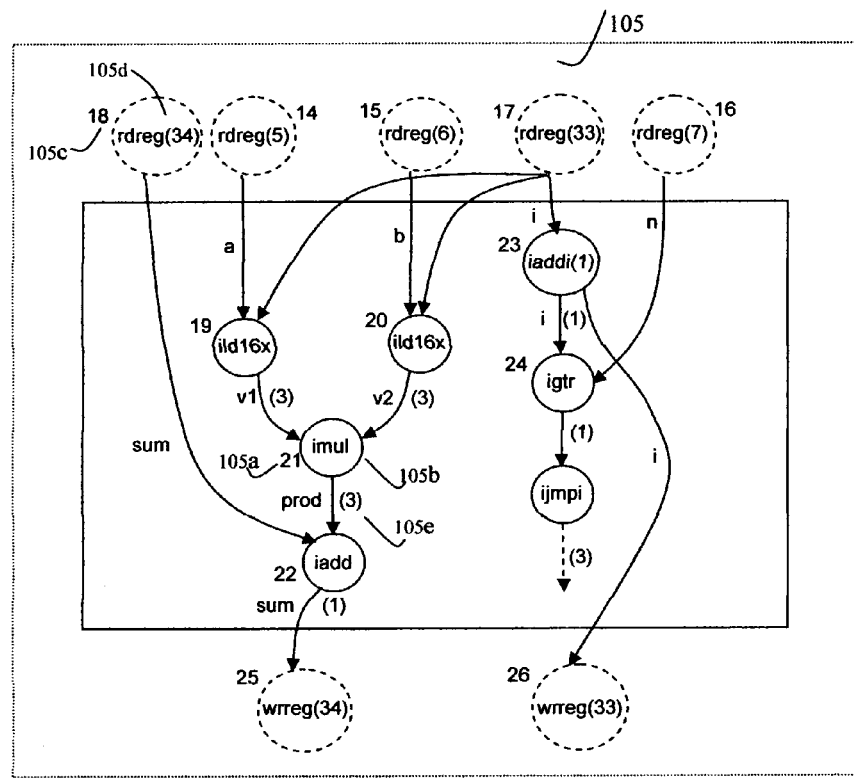

FIG. 10(d) shows a representation 105 of the DAG for the first basic block 102 of the decision tree _dotproductW_DT_1. The nodes represent machine and pseudo operations with the corresponding operation numbers labeled alongside. For example, operation number 21 105a corresponds to machine operation 'imul' 105b. The operation number 18 105c corresponds to pseudo operation 'rdreg(34)' 105d, where 34 refers to register r34. The latencies of machine operations are shown in parenthesis, along the edges. For example, the latency of operation 'imul' 105a is, three shown as (3) 105e. To show correspondence with the C code of FIG. 10(a), the variable names are also indicated along the edges.

Figure 11B:
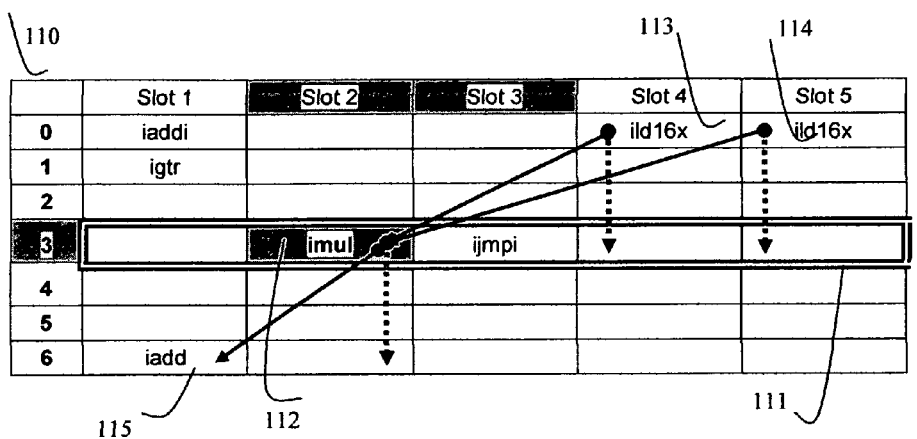

FIG. 11(a) shows scheduled assembly code in textual form corresponding to representation 105 of DAG in FIG. 10(d). The corresponding grid view 110, by VIS, is shown in FIG. 11(b) whereas the list view 111 is shown in FIG. 11(c). The nops in the grid view 110 are optionally hidden for programmer's convenience. It is apparent that unlike the textual form, in the graphical form, the latencies, slot restrictions of the selected operation, as well as relevant parts of the dependency graph are evident at a glance. The rectangular boundary 111 shows slack for the selected operation 'imul' 112. The reason of absence of flexibility in scheduling operation 112 is apparent immediately; for example, the results of the parents 113 and 114 are not available before cycle 3, due to latencies associated with load operation 'ild16x'. Furthermore, the child operation 'iadd' 115 is scheduled as soon as the result of the parent operation 'imul' 112 is available.

FIG. 11(d), shows that operation 'igtr' 116 can be scheduled in any available slots in cycle 2 and 3 117 without moving other operations. Any drag and drop operation that would violate architectural or algorithmic constraints are not allowed and the reason is informed through an output message window. For example, in FIG. 11(b) if a programmer drags the operation 'imul' 112 onto a slot in cycle 2, a message "results of parent not available in cycle 2" is displayed and the operation jumps back to its original slot. Similarly, if this operation is dropped onto slot 1 in the same cycle, "operation not valid in slot 1" is displayed in the message window.

Different view options for the grid view are made available by the VIS. These are 'concise view', 'normal view', and 'assembly view'. FIG. 11(d) is an example of the concise view showing only the mnemonic of the operations. The normal view is shown in FIG. 11(e). This view indicates the operands and operation numbers as given in the tree code (".t") file. FIG. 11(f) shows the assembly view in which register allocation is also shown. Programmer can switch to any of the above mentioned views for convenience.

The difficult task of register allocation is handled by VIS automatically, enabling the programmer to concentrate fully on the scheduling aspect. However, the VIS keeps the programmer informed of the availability status of the registers for each cycle.

FIG. 12 shows information about the status of TriMedia VLIW registers in the extended grid view 120. The columns 121, 122, 123 show the number of callee, caller and local registers, respectively. The column '.Regs' 124 shows the total number of registers available during each cycle. The column 'WB' 125 indicates the number of the writebacks for each cycle. TriMedia can write a maximum of five results per cycle to the register file; this is one of the architectural constraints of TriMedia core.

Normally, due to the availability of a large number of registers (such as in case of TriMedia), there is not going to be any shortage of registers during scheduling. However, in an unusual case, when register pressure is excessive, feedback on the availability status of registers can be used by the programmer to manipulate operations to relieve the pressure The following example, illustrated in FIGS. 13(a)-(e), shows one of the useful ways in which, a programmer can make use of the VIS. This example is for a TriMedia processor, the PNX1700, but the principle concept is generally applicable. A portion of scheduled code 130 of a DCT routine is shown in FIG. 13(a) having a number of no operations (nops), shown as empty slots. To optimize the code, these need to be filled with useful operations. This can be achieved by reordering the nops towards the bottom or top of the scheduled code. Once the nops are bubbled up or down, resulting in a cycle containing only nops, the cycle can be deleted. Similarly, manipulations can be carried out that result in a full cycle consisting of nops anywhere within a schedule. This cycle can then usually be deleted without violating the architectural/algorithmic constraints, resulting in reduction of total cycles by one.

FIG. 13(a) shows a state of the scheduled code 130 where cycle 69 130a consists of three nops and two useful operations. If we can move the useful operations of cell [69, 4] 130b and cell [69, 5] 130c to some other valid locations, cycle 69 can be eliminated. When cell [69, 4] 130b is selected, VIS indicates its slack 130d whereby it can be scheduled in cycles 69 through 72. The slots in which operation 'pack16msb' 130b can be issued are indicated by highlighted slots 1 through 4 130e. Therefore, it is valid to move operation 130c to cell [70, 1] 130f.

The status of the scheduled code 131 is shown in FIG. 13(b), whereby operation 'pack16msb' has been moved to cell [70,1] 131a. Now, if the operation in cell [69,5] 131b can also be relocated, cycle 69 can be eliminated altogether. One possibility, apparently, is to move it to cell [72, 4] 131c replacing a nop.

However, this cannot be done since operation 'dspisub' in cell [69,5] 132b can only be issued in slots 1, 3 and 5, as can be seen from the highlighted slots 132a in FIG. 13(c). However, if any other operation can be shuffled in cycle 72 to make room for operation of cell [69,5] 132b, the objective can be achieved.

When operation 'isub' of cell [72,3] 133a is selected, as shown in FIG. 13(d), it is evident that it can also be issued in slot 4 133b. Therefore, the operation 133a can be moved to cell [72, 4] 133b, thus creating room for moving the operation of cell [69,5] 133c.

FIG. 13(e) shows cycle 69 134a consisting of all nops after the above manipulations and, hence, can be deleted. In this case, the VIS allows the deletion since no architectural or algorithmic constraints are violated. A programmer can then continue deleting cycles to further increase the ILP.

The above example shows that the programmer has been assisted by the VIS to carry out the task in a user friendly manner without worrying about violating architectural and algorithmic constraints. A difficult job of register assignment has also been handled automatically. Accordingly, a method and apparatus consistent wife the invention raises the abstraction level for VLIW assembly language programming.

Figure 14:
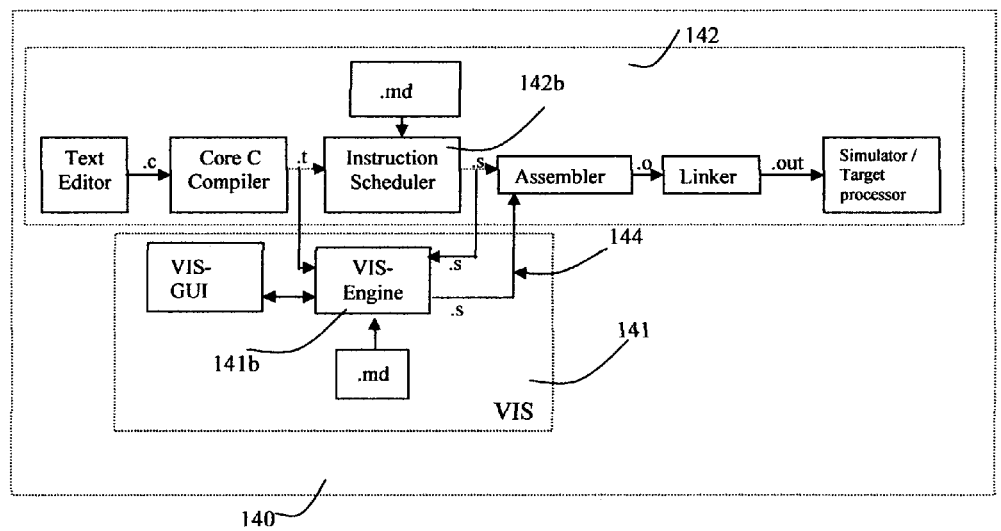
FIG. 14 illustrates another embodiment of the invention whereby both assembly code and intermediate code from the VLIW compiler can used as input to VIS.

In another embodiment of the invention, the input to the apparatus can be both the scheduled assembly code (".s") and the intermediate code (".t") of the VLIW compilation system. This provides an advantage of using the output of the instruction scheduler of the VLIW compiler as a starting point. An embodiment of this nature is illustrated in FIG. 14, showing the VIS 141 coupled to a TriMedia compilation system (TCS) 142. In this case, the VIS-Engine 141b does not auto-schedule operations but uses the output of the instruction scheduler 142b and establishes one-to-one correspondence between the scheduled code (".s") and the list of operations of the intermediate code (".t"). The scheduled code is displayed and the inter-relationship between operations are derived. A programmer can then manipulate the code interactively to optimize the code further and the optimized assembly code (.s) 144 can be fed back to the VLIW compiler tool chain. In cases, when one to one correspondence does not exist between ".t" and ".t" code, the programmer can discard the ".s" file and reschedule the ".t" file from scratch as in the embodiment mentioned earlier.

Figure 15:
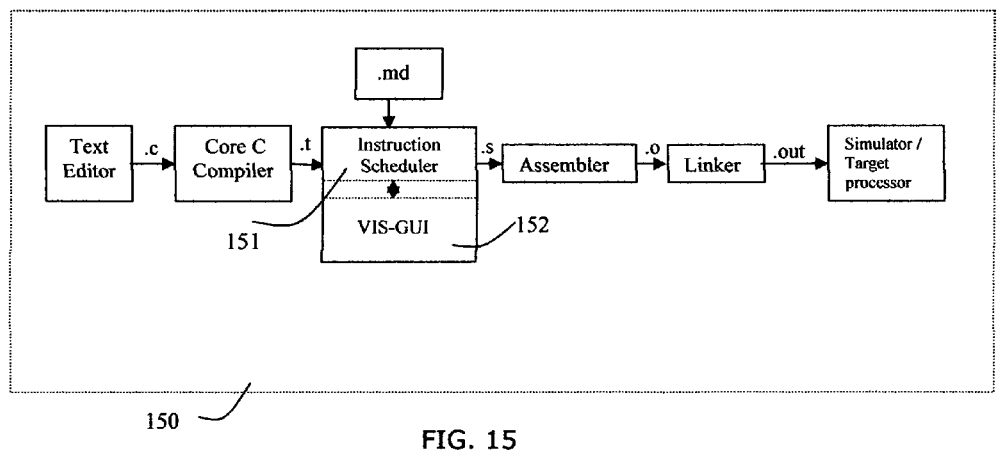
FIG. 15 illustrates another embodiment of the invention whereby the invention can be directly integrated in the instruction scheduler of a VLIW compiler.

The invention can also be integrated into the instruction scheduler 151 of a VLIW compiler 150, as shown in FIG. 15. This will enable a VLIW compiler fool chain to provide an additional feature of easy hand-scheduling, in graphical form, to the assembly programmer when required. The instruction scheduler becomes the backend VIS-engine incorporating its methods that interact with the now embedded VIS-GUI in providing a graphical user interface that exposes the dependency and architectural constraints to the programmer for feedback interaction.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts (e.g., with architectures and processors) that have not explicitly been addressed herein. In general, the scope of the invention is defined by the claims and their equivalents.

The invention claimed is:

1. A computer-implemented method comprising:
   displaying a graphical representation of assembly code instructions including multiple individual operations that have been scheduled by an automated instruction scheduler, for execution by a target VLIW processor, along with a graphical representation of one or more instruction-scheduling constraints;
   displaying a linear list view of the individual operations, wherein the individual operations are arranged in topological order and displayed alongside each operation is a graphical indicator indicating the scheduling state of the operation, wherein possible scheduling states include: scheduled, ready, and not ready;
   displaying a grid view of individual operations scheduled in cells of a two-dimensional grid, wherein columns of the grid correspond with VLIW issue slots and rows of the grid correspond with cycle numbers;
   displaying directed lines to show a partial view of a dependency graph indicating specified levels of a parent-child relationship of a selected operation in the list and grid view;
   displaying dotted lines to show latencies associated with a selected operation and that of the selected operation's parents in the grid view;
   highlighting those VLIW issue slots in the grid view where a selected operation can be scheduled; and
   facilitating interactive reordering of the multiple individual operations by means of the graphical user interface.

2. The computer-implemented method of claim 1, further comprising:
   enforcing algorithmic instruction-scheduling constraints defined by a dependency directed acyclic graph derived from an intermediate representation of an algorithm consisting of operations, so as to disallow interactive scheduling of operations in violation of the algorithmic instruction-scheduling constraints.

3. The computer-implemented method of claim 1, further comprising:
   enforcing architectural instruction-scheduling constraints defined by a machine description file associated with the target VLIW processor, so as to disallow interactive scheduling of operations in violation of the architectural instruction-scheduling constraints.

4. The computer-implemented method of claim 1, further comprising:
   displaying a rectangular boundary for a selected operation, wherein the rectangular boundary represents slack, associated with the selected operation.

5. The computer-implemented method of claim 1, wherein the operations displayed in list view and grid view have a one-to-one correspondence and said list view and grid view are synchronized such that selection of an operation displayed in the list view causes a corresponding operation to be selected in the grid view, and selection of an operation displayed in the grid view causes a corresponding operation to be selected in the list view.

6. The computer-implemented method of claim 1, further comprising:
   displaying usage statistics of VLIW registers and writeback status for each cycle in the grid view.

7. The computer-implemented method of claim 1, further comprising:
   for each operation displayed in grid view, providing three alternative view options, including: a concise view, showing an operation mnemonic for the operation; normal view, showing operands and operation numbers; and, assembly view, showing register allocation information for the operation.

8. The computer-implemented method of claim 1, wherein said facilitating interactive reordering of the multiple individual operations by means of the graphical user interface occurs in grid view after the automatic instruction scheduler has initially scheduled the multiple individual operations displayed in grid view.

9. The computer-implemented method of claim 1, wherein said facilitating interactive reordering of the multiple individual operations by means of the graphical user interface occurs in list view so as to allow scheduling of all operations displayed in list view having a scheduling state of ready.

10. The computer-implemented method of claim 1, wherein facilitating interactive reordering of the multiple individual operations by means of the graphical user interface includes enabling, via the graphical user interface, a selected operation to be dragged and dropped from a first cell to a second cell, displayed in grid view, if architectural and algorithmic constraints are not violated.

11. The computer-implemented method of claim 1, wherein facilitating interactive reordering of the multiple individual operations by means of the graphical user interface includes enabling, via the graphical user interface, a selected operation to be dragged and dropped from a first cell to a no operation (nop), displayed in grid view, if architectural and algorithmic constraints are not violated.

12. The computer-implemented method of claim 1, wherein said facilitating interactive reordering of the multiple individual operations by means of the graphical user interface includes deleting a cycle consisting of a full row of "no operations" in the grid view, as a result of interactively scheduling one or more individual operations.

13. An apparatus having at least a processor executing instructions comprising:
   logic configured to display a graphical representation of assembly code instructions including multiple individual operations that have been scheduled by an automated instruction scheduler for execution by a target VLIW processor along with a graphical representation of one or more instruction-scheduling constraints;
   logic configured to display a list view of the individual operations, wherein the individual operations are arranged in topological order and displayed alongside each operation is a graphical indicator indicating the scheduling state of the operation, wherein possible scheduling states include: scheduled, ready, and not ready;

logic configured to display a grid view of individual operations scheduled in cells of a two-dimensional grid, wherein columns of the grid correspond with VLIW issue slots and rows of the grid correspond with cycle numbers;

logic configured to display directed lines to show a partial view of a dependency graph indicating specified levels of a parent-child relationship of a selected operation in the list and grid view;

logic configured to display dotted lines to show latencies associated with a selected operation and that of the selected operation's parents in the grid view;

logic configured to highlight those VLIW slots in the grid view where a selected operation can be scheduled; and logic to facilitate interactive reordering of the multiple individual operations by means of the graphical user interface.

14. The apparatus of claim 13, further comprising;

logic to receive as input an intermediate representation of an algorithm consisting of operations, wherein the operations are consistent with the instruction set architecture of the target VLIW processor.

15. The apparatus of claim 13, further comprising:

logic to receive as input a combination of assembly code instructions including multiple individual operations and an intermediate representation of an algorithm consisting of operations, wherein the operations are consistent with, the instruction set architecture of the target VLIW processor.

16. The apparatus of claim 13, further comprising:

logic configured to attempt to establish a one-to-one correspondence between the operations of the intermediate representation of the algorithm and the operations of the input assembly code instructions, and if a one-to-one correspondence cannot be established between the operations of the intermediate representation of the algorithm and the operations of the input assembly code instructions, to provide to the automated instruction scheduler only the intermediate representation of the algorithm.

17. The apparatus of claim 13, wherein said logic to facilitate interactive reordering of the multiple individual instructions by means of the graphical user interface enables interactive rescheduling of individual operations after the automated instruction scheduler has provided an initial scheduling of the multiple individual operations of the assembly code instructions.

18. The apparatus of claim 13, wherein said logic to facilitate interactive reordering of the multiple individual operations by means of the graphical user interface enables interactive rescheduling of individual operations, where the automatic instruction scheduler can be stopped during scheduling, allowing for override of the scheduling of an operation before resuming.

19. The apparatus of claim 13, further comprising:

logic for automatically handling register assignment during automatic and interactive instruction scheduling.

20. The apparatus of claim 13, further comprising:

logic to display an error message when a result of an interactive scheduling operation violates an architectural or algorithmic scheduling constraint.

* * * * *